(12) United States Patent
Chen

(10) Patent No.: US 8,917,503 B2
(45) Date of Patent: Dec. 23, 2014

(54) HEAT DISSIPATION DEVICE

(71) Applicants: Hong Fu Jin Precision Industry (ShenZhen) Co., Ltd., Shenzhen (CN); Hon Hai Precision Industry Co., Ltd., New Taipei (TW)

(72) Inventor: Qiang Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 222 days.

(21) Appl. No.: 13/671,856

(22) Filed: Nov. 8, 2012

(65) Prior Publication Data

US 2014/0016264 A1 Jan. 16, 2014

(30) Foreign Application Priority Data

Jul. 13, 2012 (CN) .................. 2012 1 02426298

(51) Int. Cl.
*H05K 7/20* (2006.01)
*F28F 13/12* (2006.01)
*H01L 23/467* (2006.01)
*G06F 1/20* (2006.01)

(52) U.S. Cl.
CPC .. *F28F 13/12* (2013.01); *G06F 1/20* (2013.01)
USPC ............. 361/679.47; 165/80.3; 174/548; 361/679.5; 361/697; 62/3.2; 62/3.6

(58) Field of Classification Search
CPC .......... H05K 7/20145; H05K 7/20009–7/202; G02F 2201/36; H01L 23/467; G06F 1/20–1/203; G06F 2200/201

USPC ............ 361/679.46–679.54, 688–723; 165/80.2–80.3; 174/547–548; 257/712–713, 721–722; 62/3.2

See application file for complete search history.

(56) References Cited

U.S. PATENT DOCUMENTS

| | | | |
|---|---|---|---|
| 6,567,269 B2 * | 5/2003 | Homer et al. | 361/700 |
| 6,779,348 B2 * | 8/2004 | Taban | 62/3.2 |
| 7,365,989 B2 * | 4/2008 | Peng et al. | 361/720 |
| 7,382,047 B2 * | 6/2008 | Chen et al. | 257/706 |
| 7,990,712 B2 * | 8/2011 | Fang | 361/700 |
| 8,096,136 B2 * | 1/2012 | Zheng et al. | 62/3.2 |
| 2006/0164808 A1 * | 7/2006 | Stefanoski | 361/700 |
| 2007/0119186 A1 * | 5/2007 | Kitchens et al. | 62/3.3 |
| 2007/0163269 A1 * | 7/2007 | Chung et al. | 62/3.2 |

(Continued)

*Primary Examiner* — Zachary M Pape
*Assistant Examiner* — Razmeen Gafur
(74) *Attorney, Agent, or Firm* — Novak Druce Connolly Bove + Quigg LLP

(57) ABSTRACT

A heat dissipation device is mounted in a chassis of an information handling apparatus. The heat dissipation device includes a box and a cooling member, a first heat sink, a second heat sink, and a fan received in the box. A partitioning plate mounted inside the box. The box includes defines two air passage arranged at opposite sides of the partitioning plate. The cooling member is fixed to the partitioning plate. The first and second heat sinks are respectively received in the first and second air passages, and respectively abut cold and hot sides of the cooling member. The fan drives air to flow into the box through the first air passage to be cooled by the first heat sink. At the same time, the fan drives air to flow into the box through the second air passage to absorb heat from the second heat sink.

10 Claims, 4 Drawing Sheets

(56) References Cited

U.S. PATENT DOCUMENTS

| | | | |
|---|---|---|---|
| 2009/0001560 A1* | 1/2009 | Stefanoski | 257/714 |
| 2009/0109621 A1* | 4/2009 | Cheng | 361/697 |
| 2010/0271774 A1* | 10/2010 | Peng et al. | 361/679.52 |
| 2011/0061400 A1* | 3/2011 | Park et al. | 62/3.2 |

\* cited by examiner

HEAT DISSIPATION DEVICE

BACKGROUND

1. Technical Field

The present disclosure relates to a heat dissipation device for an information handling device.

2. Description of Related Art

An information handling device, such as a personal computer, includes a fan mounted to a rear wall of an enclosure of the information handling device to dissipate heat generated by heat-generating elements, such as central processing units and memory chips, out of the enclosure. However, current central processing units and the memory chips are operating faster and generating more heat. A traditional fan cannot dissipate the heat effectively even if the fan rotates increasingly faster. Moreover, the loud noise made by the fan rotating in a high speed may disturb the users.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
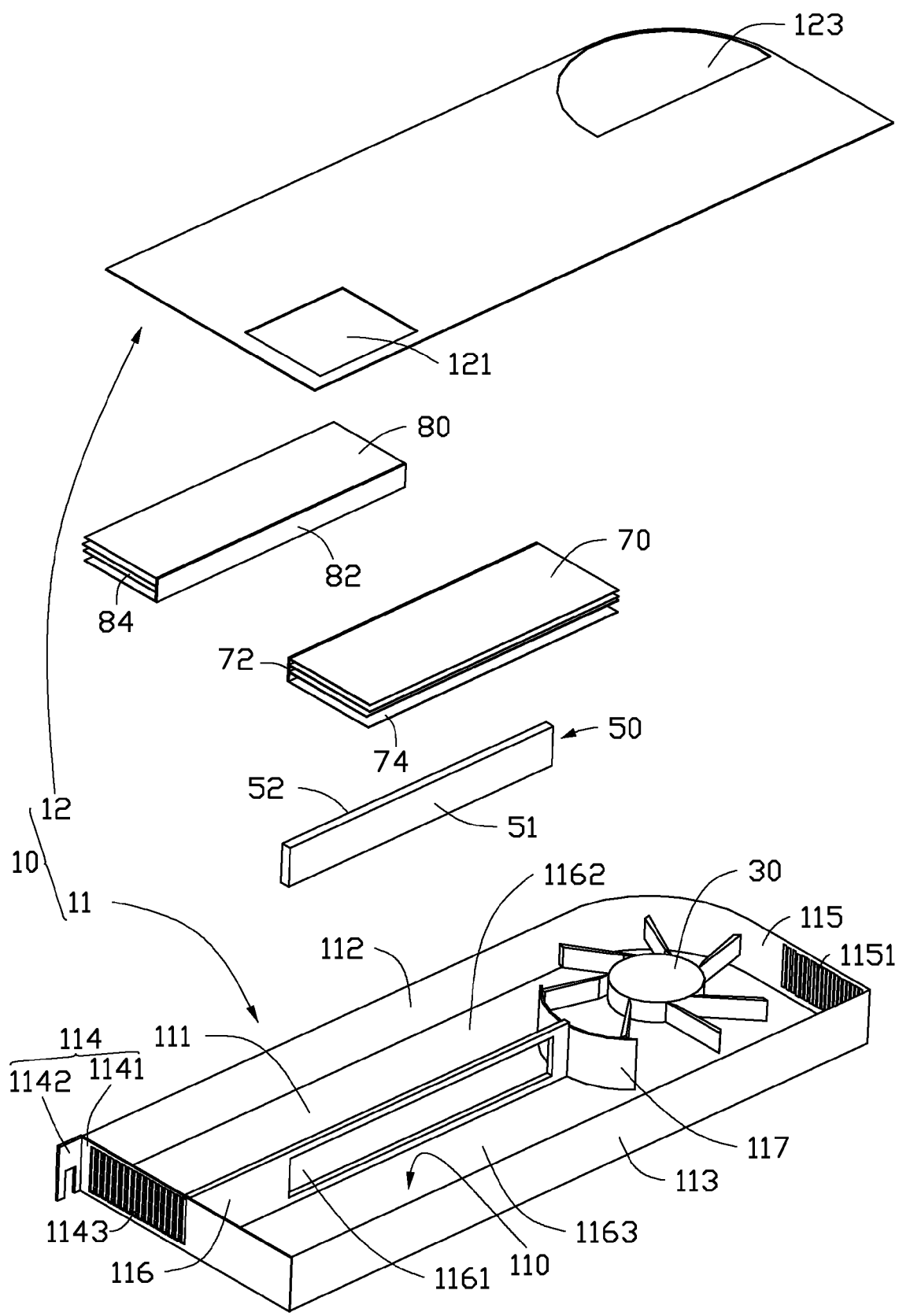
FIG. 1 is an exploded, isometric view of an exemplary embodiment of a heat dissipation device.

Referring to FIG. 1, an embodiment of a heat dissipation device includes a box 10, an air driven element 30, a cooling member 50, a first heat sink 70, and a second heat sink 80.

The box 10 includes a main body 11 and a cover 12. The main body 11 defines an accommodating space 110, which is bounded by a bottom plate 111, left and right sidewalls 112 and 113 respectively extending up from left and right sides of the bottom plate 111 in a perpendicular manner, a fixing plate 114 extending up from a rear end of the bottom plate 111, and an end plate 115 extending up from a front end of the bottom plate 111 and connected between the left and right sidewalls 112 and 113. A partitioning plate 116 extends up from the bottom plate 111. The partitioning plate 116 is substantially parallel to the left and right sidewalls 112 and 113, and is about equidistant from the left and right sidewalls 112 and 113. Thus, a first air passage 1163 is defined between the partitioning plate 116 and the right sidewall 113, and a second air passage 1162 is defined between the partitioning plate 116 and the left sidewall 112.

An arc-shaped air blocking plate 117 is connected to a front end of the partitioning plate 116, and a concaved side of the blocking plate 117 faces the end plate 115. The partitioning plate 116 defines a mounting hole 1161 extending in a fore-and aft direction. The end plate 115 defines a plurality of first dissipation holes 1151 aligned with the first air passage 1163. The fixing plate 114 is substantially L-shaped, and includes a shielding portion 1141 extending up from the rear end of the bottom plate 111 and connected between rear ends of the left and right sidewall 112 and 113, and a fixing portion 1142 extending substantially perpendicularly rearwards from an end of the shielding portion 1141 adjacent to the left sidewall 112. The shielding portion 1141 defines a plurality of second dissipation holes 1143 aligned with the second air passage 1162. The cover 12 has a same contour with the bottom plate 111, and defines a rectangular first air intake 12 in a rear and right corner of the cover 11 and a semicircular second air intake 123 in a front and left corner of the cover 11.

The air driven element 30 is mounted in the main body 11, and arranged between the blocking plate 117 and the end plate 115. In one embodiment, the air driven element 30 is a centrifugal fan, and a central axis of the fan is perpendicular to the bottom plate 111 and coplanar with the partitioning plate 116. Thus, right and left portions of the air driven element 30 are respectively aligned with the first and second air passage 1163 and 1162.

In one embodiment, the cooling member 50 is a semiconductor chilling plate including a cold side 51 and a hot side 52 opposite to the cold side 51.

The first heat sink 70 includes a base board 72 and a plurality of fins 74 extending substantially perpendicularly from the base board 72. The second heat sink 80 includes a base board 82 and a plurality of fins 84 extending substantially perpendicularly from the base board 82.

Figure 2:
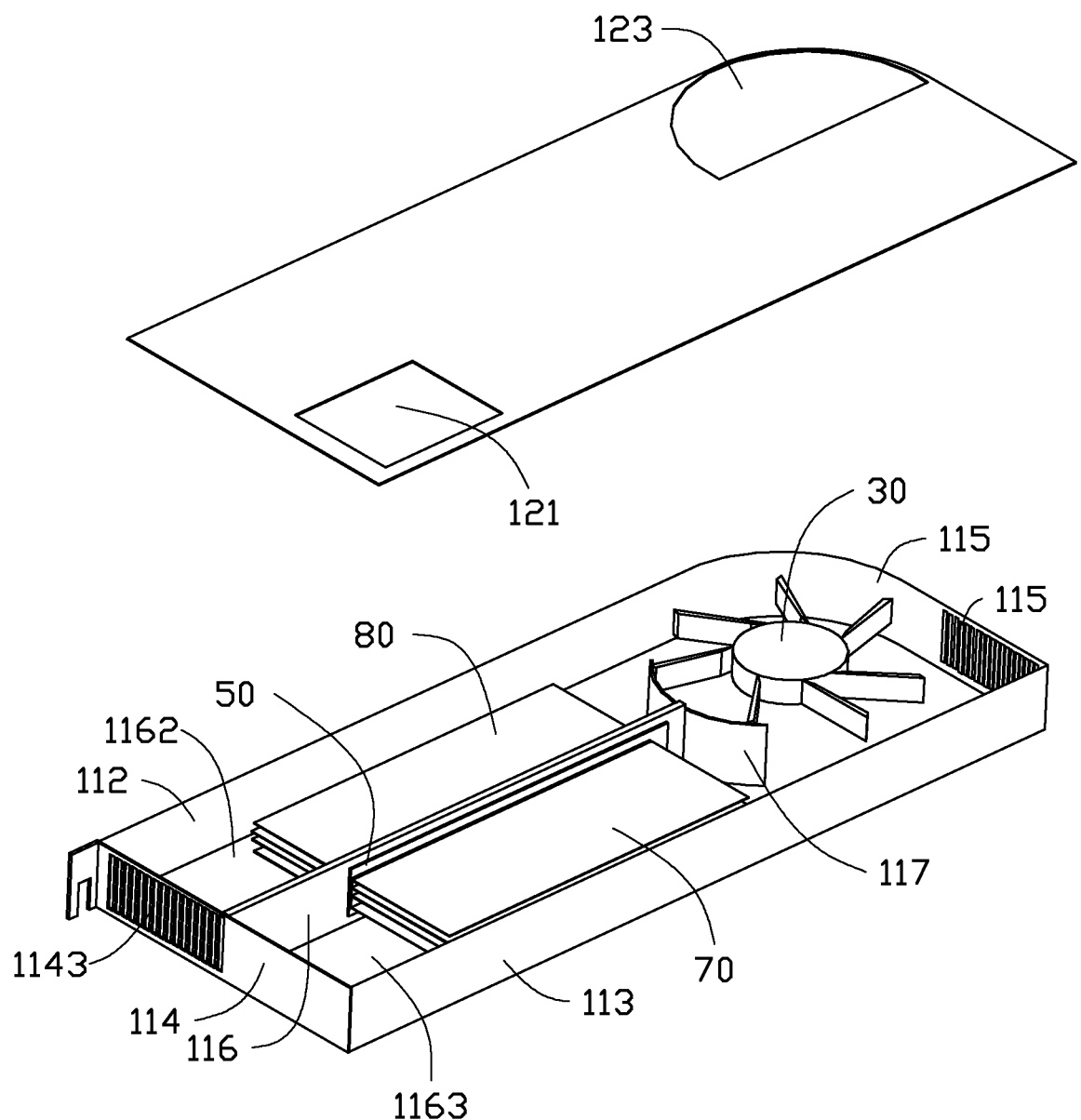
FIG. 2 is a partially assembled view of FIG. 1.

Referring to FIG. 2, in assembly, the cooling member 50 is fixed in the mounting hole 1161 of the partitioning plate 116, with the cold side 51 facing the first air passage 1163, and the hot side 52 facing the second air passage 1162. The first heat sink 70 is received in the first air passage 1163, with the base board 72 of the first heat sink 70 abutting the cold side 51 of the cooling member 50. The second heat sink 80 is received in the second air passage 1162, with the base board 82 of the second heat sink 80 abutting the hot side 52 of the cooling member 50. The cover 12 is mounted to a top of the main body 11, with the first air intake 121 aligned with a rear end of the first air passage 1163, and the second air intake 123 aligned with the left portion of the air driven element 30.

Figure 3:
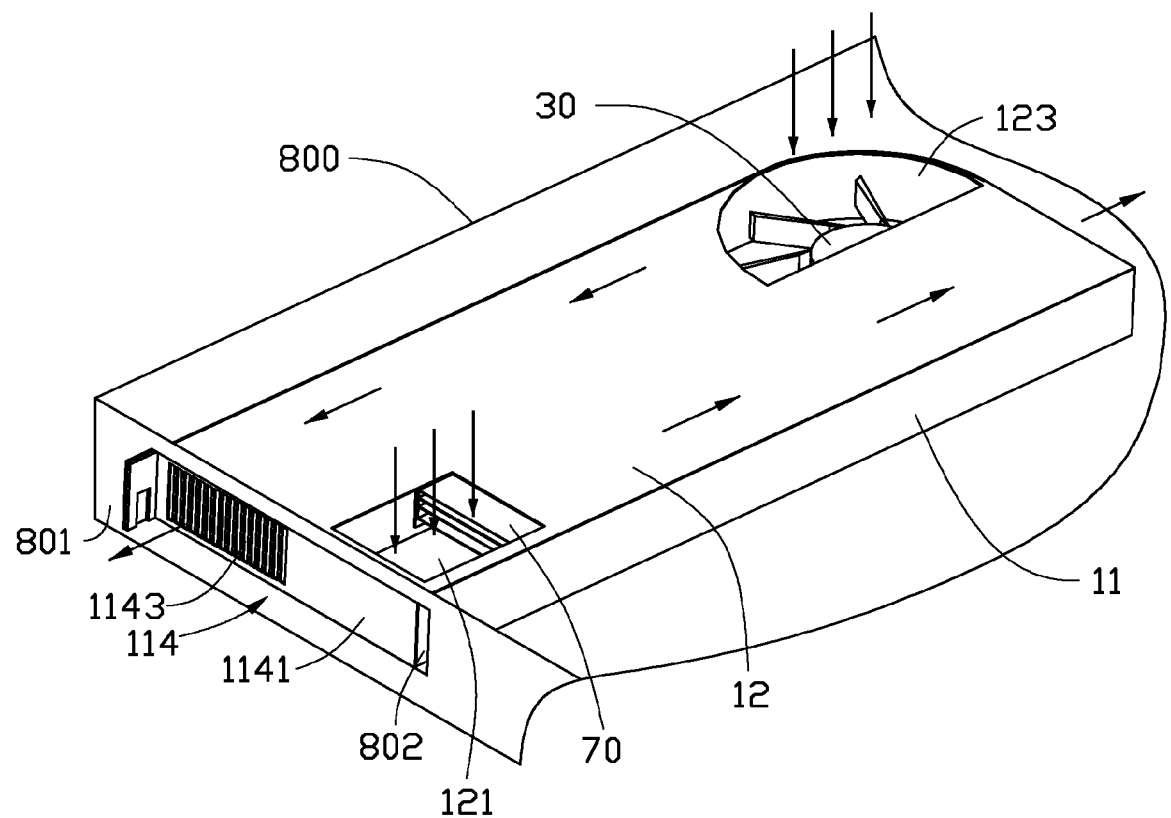
FIG. 3 shows the heat dissipation device of FIG. 1 mounted in a chassis.
Figure 4:
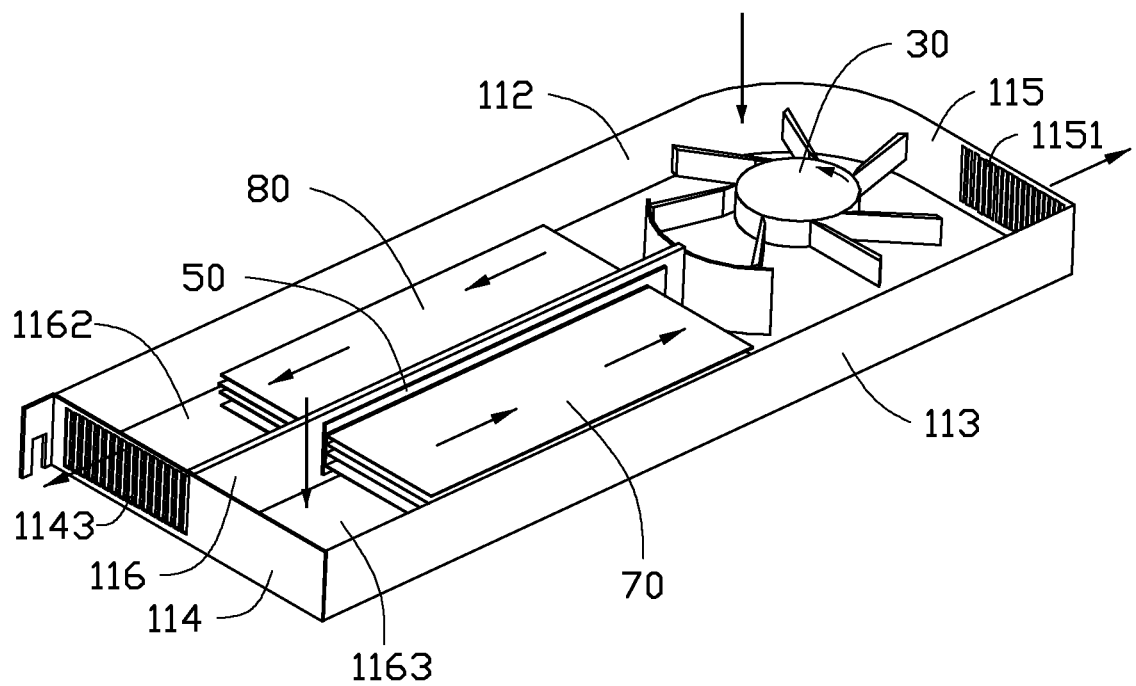
FIG. 4 shows the heat dissipation device of FIG. 3 in use.

Referring to FIGS. 3 and 4, in use, the heat dissipation device is accommodated in a chassis 800 of an information handling apparatus, such as a computer. The chassis 800 includes a rear wall 801 defining an opening 802. The fixing plate 114 is fixed to the rear wall 801 of the chassis 800, with the shielding portion 1141 shielding the opening 802.

The air driven element 30 and the cooling member 50 are powered on. The air driven element 30 operates, with blades of the air driven elements 30 moving towards the second air passage 1162, and moving away from the first air passage 1163. The cold side 51 of the cooling member 50 and the first heat sink 70 are chilled. The hot side 52 of the cooling member 50 and the second heat sink 80 are heated. The air driven element 30 drives air to flow into the box 10 through the first air intake 121, and flow forwards along the first air passage 1163. The air flowing in the first air passage 1163 is cooled by the first heat sink 70 and expelled out of box 10 through the first dissipation holes 1151 to cool air inside the chassis 800. At the same time, the air driven element 30 drives the air inside the chassis 800 to flow into the box 10 through the second air intake 123, and flow rearwards along the second air passage 1162. The air flowing in the second air passage 1162 absorbs the heat sent out by the second heat sink 80 and is expelled out of the chassis 800 through the second dissipation holes 1143 of the box 10 and the opening 802 of the chassis 800.

Even though numerous characteristics and advantages of the disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. A heat dissipation device, comprising:
   a box defining a first air passage, a second air passage, a first air intake, a second air intake, a plurality of first dissipation holes, and a plurality of second dissipation holes;
   a partitioning plate located inside the box between the first air passage and the second air passage, the first air intake and the first dissipation holes communicating with the first air passage, the second air intake and the second dissipation holes communicating with the second air passage;
   a cooling member fixed to the partitioning plate, and comprising a cold side facing the first air passage and a hot side facing the second air passage;
   a first heat sink received in the first air passage and abutting the cold side of the cooling member;
   a second heat sink received in the second air passage and abutting the hot side of the cooling member; and
   an air driven element mounted in the box, wherein the air driven element drives air to flow into the first air passage through the first air intake to be cooled by the first heat sink and expelled out of the box through the first dissipation holes; the air driven element also drives air to flow into the second air passage through the second air intake to absorb heat from the second heat sink and be expelled out of the box through the second dissipation holes.

2. The heat dissipation device of claim 1, wherein the box comprises a main body, the main body comprising a bottom plate, left and right sidewalls respectively extending up from left and right sides of the bottom plate, a fixing plate extending up from a rear end of the bottom plate, and an end plate extending up from a front end of the bottom plate and connected between the left and right sidewalls, the partitioning plate is parallel to the left and right sidewalls and is about equidistant from the left and right sidewalls, the first passage is bounded by the partitioning plate and the right sidewall, and the second air passage is bounded by the partitioning plate and the left sidewall.

3. The heat dissipation device of claim 2, wherein an arc-shaped air blocking plate is connected to a front end of the partitioning plate, the air driven element is a centrifugal fan arranged between the blocking plate and the end plate, with a central axis of the air driven element substantially perpendicular to the bottom plate and coplanar with the partitioning plate.

4. The heat dissipation device of claim 3, wherein a concave side of the blocking plate faces the end plate.

5. The heat dissipation device of claim 3, wherein the box further comprises a cover mounted to a top of the main body, the first air intake is defined in a rear and right corner of the cover, and the second air intake is defined in a front and left corner of the cover.

6. The heat dissipation device of claim 5, wherein the second air intake is semicircular and aligned with a left portion of the air driven element.

7. The heat dissipation device of claim 1, wherein the partitioning plate defines a mounting hole, and the cooling member is fixed in the mounting hole.

8. The heat dissipation device of claim 1, wherein the cooling member is a semiconductor chilling plate.

9. An information handling apparatus, comprising: a chassis comprising a rear wall defining an opening; and a heat dissipation device comprising: a box received in the chassis, and comprising a fixing plate fixed to the rear wall of the chassis, an end plate opposite to the fixing plate, the box defining a first air passage, a second air passage, a first air intake, a second air intake, a plurality of first dissipation holes, and a plurality of second dissipation holes; wherein the first air passage, the first air intake, and the first dissipation holes are arranged at a right side of a partitioning plate, the second air passage, the second air intake, and the second dissipation holes are arranged at a left side of the partitioning plate; the first dissipation holes are defined in the end plate, the second dissipation holes are defined in the fixing plate and aligned with the opening of the chassis; the partitioning plate located inside the box; a cooling member fixed to the partitioning plate, and comprising a cold side facing the first air passage and a hot side facing the second air passage; a first heat sink received in the first air passage and abutting the cold side of the cooling member; a second heat sink received in the second air passage and abutting the hot side of the cooling member; and an air driven element mounted in the box; wherein the air driven element drives air to flow into the first air passage through the first air intake to be cooled by the first heat sink and expelled out of box, thereby flowing into the chassis through the first dissipation holes; the air driven element also drives air to flow into the second air passage through the second air intake to absorb heat from the second heat sink and be expelled out of the box and the chassis through the second dissipation holes and the opening of the chassis.

10. The information handling apparatus of claim 9, wherein the cooling member is a semiconductor chilling plate.

* * * * *